United States Patent [19]

Shirogami et al.

[11] Patent Number: 4,461,813
[45] Date of Patent: Jul. 24, 1984

[54] ELECTROCHEMICAL POWER GENERATOR

[75] Inventors: Tamotsu Shirogami, Yamato; Mitsushi Ueno, Yokohama, both of Japan

[73] Assignee: Tokyo Shibaura Denki Kabushiki Kaisha, Kawasaki, Japan

[21] Appl. No.: 440,624

[22] Filed: Nov. 10, 1982

[30] Foreign Application Priority Data

Nov. 24, 1981 [JP] Japan .............................. 56-188054

[51] Int. Cl.³ .......................................... H01M 8/04
[52] U.S. Cl. ...................................... 429/34; 429/39
[58] Field of Search ...................... 429/34, 38, 39, 72, 429/35

[56] References Cited

U.S. PATENT DOCUMENTS

| | | | |
|---|---|---|---|
| 4,064,322 | 12/1977 | Bushnell et al. | 429/41 |
| 4,115,627 | 9/1978 | Christner et al. | 429/44 |
| 4,129,685 | 12/1978 | Damiano | 429/38 |
| 4,175,165 | 11/1979 | Adlhart | 429/39 X |
| 4,276,355 | 6/1981 | Kothmann | 429/35 X |
| 4,279,970 | 7/1981 | Breault et al. | 429/35 |
| 4,366,211 | 12/1982 | Pollack | 429/38 |
| 4,383,008 | 5/1983 | Chi | 429/72 |
| 4,407,904 | 10/1983 | Uozumi et al. | 429/39 X |

FOREIGN PATENT DOCUMENTS 2309991 4/1976 France .

OTHER PUBLICATIONS

Proceedings of the 13th Intersociety Energy Conversion Engineering Conference, p. 732, "Advances in Lower Cost Phosphoric Acid Fuel Cells", W. H. Johnson et al.
Patents Abstracts of Japan, vol. 6, No. 16(E-92) [894], Jan. 29, 1982.

*Primary Examiner*—Anthony Skapars
*Attorney, Agent, or Firm*—Oblon, Fisher, Spivak, McClelland & Maier

[57] ABSTRACT

The invention provides an electrochemical power generator having a structure where a plurality of unit cells are stacked such that each pair of adjacent unit cells sandwich an interconnector therebetween. Each unit cell is formed such that an anode of a porous carbon substrate having an anode catalyst layer on one surface thereof and a cathode of a porous carbon fiber sheet having a cathode catalyst layer on one surface thereof sandwich a matrix layer containing an electrolyte solution of a concentrated acid solution therebetween so as to respectively bring the two surfaces of the matrix layer into tight contact with the anode and cathode catalyst layers. The interconnector is formed of a high density carbon plate. The electrochemical power generator uses as an anode reactant material a gas containing hydrogen as a major component, and uses as a cathode reactant material an oxidizing gas. The electrochemical power generator has excellent mechanical strength and may be efficiently and stably operated without deterioration over a long time. For this purpose, a plurality of grooves which function as a gas passage for the gas containing hydrogen as its major component are formed in the other surface of the anode, the cathode is thinner than the anode and is waterproofed, and a plurality of grooves which function as a gas passage for the oxidizing gas are formed in one surface of the interconnector.

5 Claims, 1 Drawing Figure

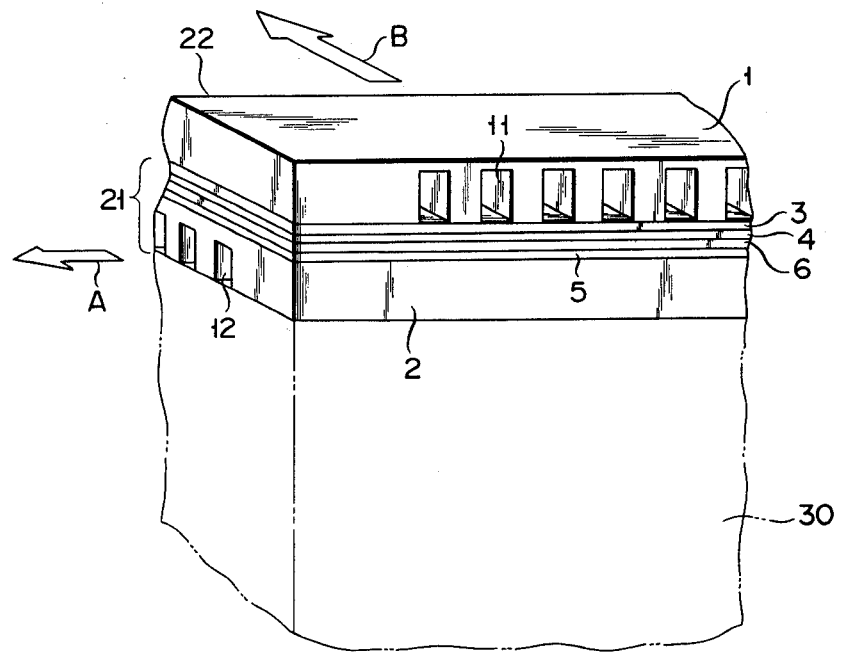

ELECTROCHEMICAL POWER GENERATOR

BACKGROUND OF THE INVENTION

The present invention relates to an electrochemical power generator and, more particularly, to an electrochemical power generator wherein a plurality of unit cells, each having an anode of a grooved (or ribbed) porous substrate carrying a catalyst layer thereon, and a plurality of grooved (or ribbed) solid interconnectors are alternately stacked.

An electrochemical power generator, where an anodic oxidation of a gas such as hydrogen which tends to be oxidized and a cathodic reaction of a gas such as oxygen are performed to generate DC power by Gibb's free energy, generally has a structure where a plurality of unit cells are stacked up together. In stacking up the unit cells, electrical connections between the unit cells must be maintained, and at the same time a gas passage must also be provided to supply a reaction gas to the unit cells and to remove a reaction product therefrom.

In order to satisfy the above requirements, an electrochemical power generator is known in which interconnectors, each comprising a grooved conductive carbon plate of a high density are sandwiched between adjacent unit cells. In the power generator of this type, a number of parallel grooves are formed on the two surfaces of the carbon plate which constitutes the interconnector. The grooves on one surface are substantially perpendicular to those on the other surface. The grooves on each surface thus constitute a gas passage. In order to stack the plurality of unit cells with the interconnectors interposed therebetween, one surface of an interconnector is brought into contact with the cathode (or anode) of a unit cell, and the other surface thereof is brought into contact with the anode (or cathode) of the next unit cell. The reaction gas is supplied to the unit cells through the grooves of the interconnectors, and the reaction product is carried out therethrough. The unit cell is generally formed such that a thin porous carbon plate as a cathode is adhered to one surface of a chemical-resistant, heat-resistant and antioxidant matrix layer impregnated with an electrolyte solution consisting of a concentrated sulfuric acid solution or a concentrated phosphoric acid solution, and a thin porous carbon plate as an anode is adhered to the other surface of the matrix layer. The cathode and anode of the unit cell are catalyzed by a catalyst such as platinum to activate the electrochemical reaction and are waterproofed by polytetrafluoroethylene or the like. The electromotive force of the unit cell of this type is 1 V at best. Therefore, several tens or hundreds of unit cells must be stacked together to obtain a practical power generator.

In order to maintain a high activity over a long period of time in the electrochemical power generator of the type described above, the reaction gas must be sufficiently supplied to the unit cells and the reaction product must be quickly removed. Furthermore, the unit cells which constitute the power generating section must be firmly secured to each other. It is important to assemble the unit cells so as to have a minumum internal electrical resistance in order to increase the heat rate of the power generator. For this purpose, the ohmic loss of the matrix layer and the contact resistance loss between the interconnector and the electrode must be minimized. In this case, since the ohmic loss of the matrix layer is greatly changed in accordance with the amount of electrolyte solution impregnated in the matrix layer, there is a constant requirement over time for a sufficient amount of the electrolyte solution between the anode and the cathode. Furthermore, in order to firmly fix adjacent unit cells through the interconnector so as to minimize the resistance loss between adjacent units, the interconnector must be brought into tight contact with the adjacent unit cells.

However, in the conventional electrochemical power generator, the anode and the cathode are respectively made of thin porous carbon plates, and the interconnector is made of a very hard material having a density of about 1.8. When adjacent unit cells are pressed together sandwiching the interconnector therebetween, the unit cells are themselves compressed by the interconnectors. In the worst case, the unit cells are damaged. Further, the electrolyte solution is contained only in the matrix layer since the electrodes are very thin. Therefore, a sufficient amount of electrolyte solution cannot be contained in the unit cell, thus shortening the service life of the power generator.

In order to eliminate the above drawbacks, the following power generator is proposed. In this power generator, both the anode and cathode comprise a thick porous carbon plate in which grooves constituting a gas passage are formed on one surface thereof, and a catalyst layer is formed on the other surface. Furthermore, an interconnector comprises a thin conductive plate. According to the power generator of this type, since the anode and the cathode are made of thick porous carbon plates, respectively, they may not be damaged even if they are compressed. Furthermore, the electrolyte solution may also be impregnated in the anode and the cathode as well in the matrix layer. However, in the power generator of this type, the resistance loss is great since the anode and the cathode are thick. A gas may leak from the edge portions of the anode and the cathode, and air can hardly be dispersed, thus lowering utilization of the air.

SUMMARY OF THE INVENTION

It is an object of the present invention to provide an electrochemical power generator which is stably operated with high efficiency over time.

The electrochemical power generator according to the present invention has a structure wherein a plurality of unit cells and a plurality of interconnectors are stacked alternating with one another, each unit cell being formed such that a matrix layer containing an electrolyte solution of a concentrated acid solution is sandwiched between an anode of a porous carbon substrate having one surface which carries an anode catalyst layer thereon and a cathode of a porous carbon fiber sheet having one surface which carries a cathode catalyst layer thereon so as to oppose the anode and cathode catalyst layers, and each interconnector being made of a high density carbon plate. A gas containing hydrogen as its major component is used as an anode reactant material, while an oxidizing gas is used as a cathode reactant material. In the electrochemical power generator of this type, a plurality of grooves which function as a gas passage for the gas containing hydrogen as its major component are formed on the other surface of the anode. The cathode is thin and waterproofed. A plurality of grooves which function as a gas passage for the oxidizing gas are formed on one surface of the interconnector.

More particularly, the anode of the power generator of the present invention comprises a porous carbonized conductive plate such as a felt-like carbon fiber plate, a carbon fiber sheet or a porous sintered plate having a bulk density of 0.28 to 0.78 and a thickness of 2 to 4 mm; has a number of grooves each having a rectangular section, a width of 1.2 to 2.5 mm and a depth of 1.5 to 2.5 mm arranged at intervals of 3 to 5 mm on the other surface thereof; and has an anode catalyst layer to accelerate the electrode reaction on one surface thereof. The cathode comprises a waterproofed carbon fiber sheet impregnated with a suspension of a fluoro-polymer such as polytetrafluoroethylene and has a cathode catalyst layer on one surface thereof. The matrix layer is prepared by impregnating a kneaded body of a resin and a powder such as silicon carbide, tantalum oxide and zirconia with a concentrated acid such as concentrated phosphoric acid. The interconnector is compression molded by blending a phenolic resin and a graphite powder and has a bulk density of 1.6 to 1.95 and a thickness of 3 to 6 mm. A number of grooves having a rectangular section, a width of 1.2 to 2.5 mm and a depth of 1.5 to 2.5 mm are formed at intervals of 3 to 5 mm in one surface of the interconnector.

According to the electrochemical power generator of the present invention, the rib portion of the anode on the surface having the grooves functions as a reservoir of the electrolyte solution, as does the matrix layer. The amount of the electrolyte solution is sufficient to maintain the concentration of the electrolyte solution constant. Unlike the conventional power generator where the electrolyte solution is contained only in the matrix layer, the power generator according to the present invention provides a long service life. Further, since the anode comprises a thick porous layer, the anode functions as a pressure-absorbing damper when the unit cells are stacked, thus preventing damage to the unit cells. Further, since the cathode comprises a thin layer, it allows air to easily disperse. As a result, the utilization of air is increased.

BRIEF DESCRIPTION OF THE DRAWING

The FIGURE is an oblique view showing the main part of an electrochemical power generator according to an embodiment of the present invention.

DETAILED DESCRIPTION OF THE PREFERRED EMBODIMENT

Referring to the figure, grooves 12 which function as a gas passage are formed to extend in the direction indicated by arrow A in the lower surface of a porous carbon substrate 2 of 2 to 4 mm thickness. The porous carbon substrate 2 functions as an anode. An anode catalyst layer 5 is carried on the upper surface of the porous carbon substrate 2. A porous carbon fiber substrate 3 which has a thickness of about 0.4 mm and functions as the cathode is waterproofed by a fluoro-polymer such as polytetrafluoroethylene. A cathode catalyst layer 4 is carried on one of the surfaces of the porous carbon fiber substrate 3 to accelerate the chemical reaction of an oxidizing agent. The anode and the cathode respectively oppose the two surfaces of an electrolyte matrix layer 6 and are adhered thereto to form a unit cell 22. The electrolyte matrix layer 6 comprises a kneaded body of a resin and a powder such as silicon carbide, tantalum oxide or zirconia, which is impregnated with a concentrated phosphoric acid solution. A plurality of unit cells 21, all adjacent pairs of which sandwich an interconnector 22 therebetween, are stacked to form an electrochemical power generator. The interconnector 22 comprises a high density carbon plate. Grooves 11 which function as a gas passage are formed to extend in the direction indicated by arrow B in the lower surface of the high density carbon plate. The unit cells are stacked such that the direction indicated by arrow A is substantially perpendicular to the direction indicated by arrow B.

In order to maintain the shape of the power generator as it is, the stacked body comprising the plurality of unit cells, all adjacent pairs of which sandwich the interconnector 22 therebetween, must be compressed along its thickness and must be bonded. In the power generator according to the present invention, even if the stacked body is clamped at a pressure of 5 to 10 kg/cm$^2$, the anode 2 functions as a pressure-absorbing damper. Thus, the pressure is uniformly applied to the unit cells 21, eliminating defects such as cracks and breakage. Furthermore, the electrical connection between adjacent unit cells 21 and the interconnector 22 is excellent. Since some electrolyte solution is contained in the rib portion on the surface of the anode, the concentration of the electrolyte solution in the matrix layer can be kept constant over time. As a result, deterioration of the electrical characteristics over time due to ohmic loss of the matrix layer can be substantially eliminated.

Further, since the cathode is thin, it allows the reactive gas to flow quickly to the electrode reaction point. The cathode is waterproofed as described above, so that degradation in performance due to the water reaction product is prevented even if air is used as the oxidizing agent. In the power generator using the cathode of the type described above, excellent electrical characteristics are obtained, and no substantial deterioration over time can be found.

The bulk density of the porous carbon plate suitable for the substrate 2 is preferably within a range to allow deformation of 3 to 8% at a clamping pressure of 10 kg/cm$^2$. The bulk density of the interconnector 22 is preferably within the same range as that of the porous carbon plate of the anode, in consideration of the former's conductivity and mechanical strength.

Examples will now be described to fully show the effects of the present invention.

EXAMPLE 1

Grooves having a width of 1.8 mm, a depth of 1.8 mm and a pitch of 4 mm were formed on one surface of a felt-like carbon fiber plate having a bulk density of 0.48 to 0.50 and a thickness of 2.5 mm. A catalyst prepared by kneading an active carbon powder (particle size of 3 to 5$\mu$) which was obtained by reducing and precipitating 10% by weight of platinum black, together with 8% by weight of a polytetrafluoroethylene suspension was applied to the other surface of the felt-like carbon fiber plate. Thus, an anode was prepared. A carbon fiber paper sheet having a bulk density 0.42 to 0.45 and a thickness of about 0.4 mm was dipped in a polytetrafluoroethylene suspension having a concentration of 20% and was dried. The dried sheet was then baked for 10 minutes at a temperature of 320° C. to prepare a cathode substrate. A kneaded body obtained by kneading an active carbon powder (particle size of 3 to 5$\mu$) which was obtained by reducing and precipitating 10% by weight of platinum black, together with 8% by weight of a polytetrafluoroethylene suspension was applied to one surface of the substrate. Thus, a cathode having a catalyst layer thereon was prepared. A silicon carbide powder having a particle size of 3 to 5μ was mixed and kneaded with 6% by weight of polytetrafluoroethylene to prepare a matrix layer. The matrix layer was then impregnated with 95% of an electolyte solution of a concentrated phosphoric acid. The matrix layer thus obtained was sandwiched between the cathode and the anode such that the respective catalyst layers thereof opposed the two surfaces of the matrix layer. Thus, a unit cell was prepared.

A plate obtained by blending a dense carbon and phenol resin and having a thickness of 3 mm and a specific gravity of 1.85 was used as an interconnector. In one of its surfaces, the interconnector had grooves each having a width of 2 mm, a depth of 2 mm and a pitch of 4 mm. The unit cells were stacked such that two adjacent unit cells sandwiched an interconnector therebetween, and such that the grooves of the interconnector functioned as the cathode reactant gas passage. Thus, a power generator was prepared. The cathode active gas passage was substantially perpendicular to the anode active gas passage.

The stacked body comprising unit cells and interconnectors was clamped at a pressure of 5 kg/cm$^2$ over the surface. The unit cells were not damaged at all. However, in the conventional unit cell using a rigid interconnector having grooves on its two surfaces, one out of fifteen unit cells became defective at a pressure of 3 kg/cm$^2$. Conversely, in the power generator according to the present invention, it was found that the force is uniformly dispersed to the unit cells.

The change in the internal resistance of the power generator over time was examined at a temperature of 150° C. Results are shown in Table 1. Unlike the conventional power generator using a rigid interconnector which has grooves on its two surfaces, the power generator of the present invention did not substantially deteriorate over time, thus providing safe performance. Furthermore, even if the power generator of the present invention was operated at a temperature of 150° C., at a gas pressure of 2 kg/cm$^2$G and a current density of 250 mA/cm$^2$, the terminal potential was not lowered, as shown in Table 2, unlike the conventional power generator. Thus, the power generator according to the present invention has better electrical characteristics than the conventional power generator.

TABLE 1

| Time (hours) | 100 | 500 | 3,000 |
|---|---|---|---|
| Power generator of the present invention (Ω · cm$^2$) | 0.14 | 0.13 | 0.14 |
| Conventional power generator (Ω · cm$^2$) | 0.15 | 0.18 | 0.24 |

TABLE 2

| Time (hours) | 100 | 500 | 3,000 |
|---|---|---|---|
| Power generator of the present invention (V) | 0.58 | 0.62 | 0.60 |
| Conventional power generator (V) | 0.58 | 0.60 | 0.52 |

EXAMPLE 2

A power generator in Example 2 was substantially the same as that in Example 1, except that an interconnector was prepared from carbonated acrylic resin. The same tests conducted in Example 1 were conducted for the power generator of Example 2, which was thereby proved to be far superior to the conventional power generator as in Example 1.

In this case, 10% of a polytetrafluoroethylene suspension was sprayed onto the surface of the interconnector which opposed the anode, and was then dried. The interconnector was then heated to become waterproof. As a result, water removal was satisfactory.

What we claim is:

1. An electrochemical power generator having a structure where a plurality of unit cells are stacked such that each pair of adjacent unit cells sandwich an interconnector therebetween, each unit cell being formed such that an anode of a porous carbon substrate having an anode catalyst layer on one surface thereof and a cathode of a porous carbon fiber sheet having a cathode catalyst layer on one surface thereof sandwich a matrix layer containing an electrolyte solution of a concentrated acid solution therebetween so as to respectively bring two surfaces of said matrix layer into tight contact with said anode and cathode catalyst layers respectively, said interconnector being formed from a high density carbon plate, and said electrochemical power generator using as an anode reactant material a gas containing hydrogen as a major component and using as a cathode reactant material an oxidizing gas, characterized in that a plurality of grooves which function as a gas passage for the gas containing hydrogen as the major component are formed in the other surface of said anode, said cathode is thinner than said anode and is waterproofed, and a plurality of grooves which function as a gas passage for the oxidizing gas are formed in one surface of said interconnector.

2. A generator according to claim 1, wherein said plurality of grooves formed in said one surface of said anode are substantially perpendicular to said plurality of grooves formed in said one surface of said interconnector.

3. A generator according to claim 1, wherein said matrix layer comprises a kneaded body of a resin together with a powder selected from the group consisting of silicon carbide, tantalum oxide and zirconium oxide.

4. A generator according to claim 1, wherein inner surfaces of said plurality of grooves formed in said one surface of said interconnector are waterproofed.

5. A generator according to claim 1, wherein the rib portion in the other surface of said anode contains the electrolyte solution.

* * * * *